(12) United States Patent
Journade et al.

(10) Patent No.: US 8,516,824 B2
(45) Date of Patent: Aug. 27, 2013

(54) GAS EJECTION CONE FOR AN AIRCRAFT TURBOJET EQUIPPED WITH A DEVICE FOR GENERATING TURBULENCE IN A PRIMARY FLOW LIMITING JET NOISE

(75) Inventors: Frederic Journade, Toulouse (FR); Jerome Journade, Tournefeuille (FR); Jerome Huber, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 869 days.

(21) Appl. No.: 12/673,125

(22) PCT Filed: Aug. 21, 2008

(86) PCT No.: PCT/EP2008/060932
§ 371 (c)(1),
(2), (4) Date: Feb. 11, 2010

(87) PCT Pub. No.: WO2009/024594
PCT Pub. Date: Feb. 26, 2009

(65) Prior Publication Data
US 2011/0203254 A1 Aug. 25, 2011

(30) Foreign Application Priority Data
Aug. 23, 2007 (FR) .................. 07 57137

(51) Int. Cl.
*F02K 1/06* (2006.01)
*F02K 1/08* (2006.01)

(52) U.S. Cl.
USPC ......... 60/771; 60/226.1; 60/262; 239/265.19; 181/220

(58) Field of Classification Search
USPC .......... 60/771, 226.1, 262, 264; 239/265.19; 181/213, 220
See application file for complete search history.

(56) References Cited

U.S. PATENT DOCUMENTS

| | | | | |
|---|---|---|---|---|
| 2,557,883 A | * | 6/1951 | Miller | 239/265.33 |
| 2,583,570 A | * | 1/1952 | Hickman | 60/771 |
| 2,585,270 A | | 2/1952 | Platch | |
| 2,771,740 A | * | 11/1956 | Johnson | 239/265.19 |
| 2,825,603 A | | 3/1958 | Altergott | |
| 3,174,282 A | * | 3/1965 | Harrison | 239/265.19 |
| 3,589,617 A | * | 6/1971 | Adamson | 239/265.31 |
| 5,038,559 A | | 8/1991 | Blackmore | |
| 2006/0053769 A1 | | 3/2006 | Feuillard et al. | |

FOREIGN PATENT DOCUMENTS

| | | |
|---|---|---|
| EP | 1 580 419 | 9/2005 |
| FR | 1 478 475 | 4/1967 |
| GB | 792 831 | 4/1958 |

* cited by examiner

*Primary Examiner* — Ted Kim

(74) *Attorney, Agent, or Firm* — Oblon, Spivak, McClelland, Maier & Neustadt, L.L.P.

(57) ABSTRACT

A gas ejection cone for an aircraft turbojet, the cone including a hollow main body defining, on the outside, a radially inner skin of an annular primary flow channel, and a device generating turbulence in the primary flow limiting jet noise, mounted so as to move on the main body so as to be able to be displaced from an extracted position in which the device projects toward downstream in relation to a downstream end of the hollow main body, and a retracted position in which the device is retracted into the hollow main body, and vice versa. Further, the device includes a cylindrical support body having an axis parallel to an axis of the ejection cone, and at least one fin supported by the body.

6 Claims, 3 Drawing Sheets

GAS EJECTION CONE FOR AN AIRCRAFT TURBOJET EQUIPPED WITH A DEVICE FOR GENERATING TURBULENCE IN A PRIMARY FLOW LIMITING JET NOISE

TECHNICAL FIELD

The present invention generally relates to an engine assembly for an aircraft comprising a turbojet having a crankcase, this assembly also comprising a gas ejection cone defining a radially inner skin of an annular primary flow channel, this ejection cone being fixedly mounted on a rear end of the crankcase. The invention also relates to such an ejection cone.

The engine assembly according to the invention also comprises an attachment mast making it globally possible to suspend the turbojet below the wing system of the aircraft, or to mount this turbojet above this same wing assembly, or even to assemble this engine on a rear fuselage portion of the aircraft.

BACKGROUND OF THE INVENTION

The jet of an aircraft turbojet constitutes a relatively significant source of noise, which it is necessary to reduce in particular during the takeoff and landing phases of the aircraft, in order to best limit the noise nuisances suffered by airport inhabitants.

In a known manner, the jet of a dual-flow turbojet is made up of a hot primary flow escaping from an annular space situated between a nozzle and a gas ejection cone, and by a cool secondary flow escaping from an annular space defined radially, toward the inside, by this same nozzle.

In order to reduce the jet noise, it has been proposed in the prior art to place chevrons on the downstream end of the nozzle, so as to allow better mixing of the primary and secondary flows, synonymous with reducing the jet noise. Such a configuration using chevrons is for example known from documents EP 1 580 419 and US 2006/053769.

In general, the implementation of chevrons is satisfactory in terms of observed noise reduction, but it is largely detrimental to the performance of the turbojet, due to the aerodynamic disturbance created on the primary, secondary and outside flows.

The harmful aerodynamic impact on the secondary flow is even more restrictive given that on current turbojets, the high rate of dilution means that this flow is supposed to deliver 80% or more of the thrust.

Moreover, chevrons are often extremely difficult to install, in particular due to a nozzle trailing edge with an extremely small thickness.

DISCLOSURE OF THE INVENTION

The invention therefore aims to resolve the aforementioned drawbacks relative to the embodiments of the prior art at least partially.

To do this, the object of the invention is a gas ejection cone for an aircraft turbojet, said cone having a hollow main body defining, on the outside, a radially inner skin of an annular primary flow channel of the turbojet. According to the invention, the cone further includes a device for generating turbulence in said primary flow, which is mounted so as to move on said main body so as to be able to be displaced from an extracted position in which it projects toward the downstream relative to a downstream end of said hollow main body, and a retracted position in which it is retracted into said hollow main body, and vice versa. In addition, said device for generating turbulence comprises a cylindrical support body, having an axis parallel to an axis of the ejection cone, and preferably combined therewith, as well as at least one fin supported by said cylindrical support body.

As a result, the invention proposes, in an original manner, to install means, leading to reduced jet noise from the turbojet, no longer at the trailing edge of the nozzle situated upstream from the cone, but at the downstream end of this cone.

Advantageously, the secondary flow not fitting the ejection cone is therefore no longer aerodynamically impacted by the means making it possible to reduce the jet noise, which makes it possible to obtain increased overall performance of the turbojet. Indeed, the device is provided to generate turbulence on the primary flow downstream from the hollow main body of the cone, flow which usually represents only 20% or less of the overall thrust of the turbojet.

The installation of this device for generating turbulence, which can for example assume the form of one or several vortices on the primary flow in order to improve its mixing, is very easy due to the absence of equipment in this region of the turbojet, and especially due to the hollow nature of the main body, which is completely advisable for the housing of this device.

In this respect, it is noted that the device is effectively provided to be able to occupy a retracted position in which it is retracted into the hollow main body in order, under certain specific conditions, to best limit the aerodynamic disturbances generated on the primary flow. This position, which serves to make the device inoperative in its jet noise reduction function, is preferably adapted in cruising phases, when the aircraft is flying at a sufficient altitude for the noise nuisances to no longer constitute a concern.

Another advantage relative to the present invention lies in the fact that the presence of the device for generating turbulence does not require a modification of the geometric definition of the primary flow channel, such that it does not create a harmful impact on performance.

As previously mentioned, it is preferable to seek to generate one or several vortices at the downstream end of the hollow main body of the ejection cone so that these vortices then spread in the primary flow, toward the downstream. Due to their dynamics, these vortices, generated in particular by the presence of a fin or a plurality of fins, will thus modify the mixing more downstream, locally or globally depending on the chosen arrangement, and thus improve the acoustic impact of the mixing of the primary and secondary flows. Thus, it is to be understood that one preferably seeks to impact the dynamics of the mixing zone at the end of the potential cone of the primary jet, where the mixing concerns the primary flow, the second flow and the outside flow, such that this zone is acoustically modified and improved.

Preferably, one can provide that the device comprises two fins oriented essentially horizontally, and arranged on either side of said cylindrical support body.

Still preferably, said hollow main body comprises a slot for housing each fin of the device for generating turbulence in its retracted position. The cone is then preferably designed such that in the latter position, the fins do not project toward the outside of the hollow main body at all, in order to avoid aerodynamic disturbances of the primary flow.

More generally, said device for generating turbulence preferably, in its retracted position, forms, jointly with said hollow main body, an essentially continuous conical outside surface. As an example, in this same retracted position, one provides that the edge of the fins of the device is an integral part of this conical outside surface, while being in the aerodynamic extension of the outer skin of the hollow main body defining the slots.

Still with the same aim, said device for generating turbulence has a downstream end which is conical in shape, situated in the aerodynamic extension of the hollow main body, when said device for generating turbulence is in its retracted position.

Another object of the invention is a turbojet for an aircraft comprising a gas ejection cone as described above.

Lastly, one object of the invention is an engine assembly for an aircraft comprising such a turbojet, an attachment mast of the turbojet, and a nacelle integral with the mast and surrounding said turbojet.

Other advantages and characteristics of the invention will appear in the non-limiting detailed description below.

BRIEF DESCRIPTION OF THE DRAWINGS

This description will be done with regard to the appended drawings, in which.

DETAILED DESCRIPTION OF THE PREFERRED EMBODIMENTS

Figure 1:
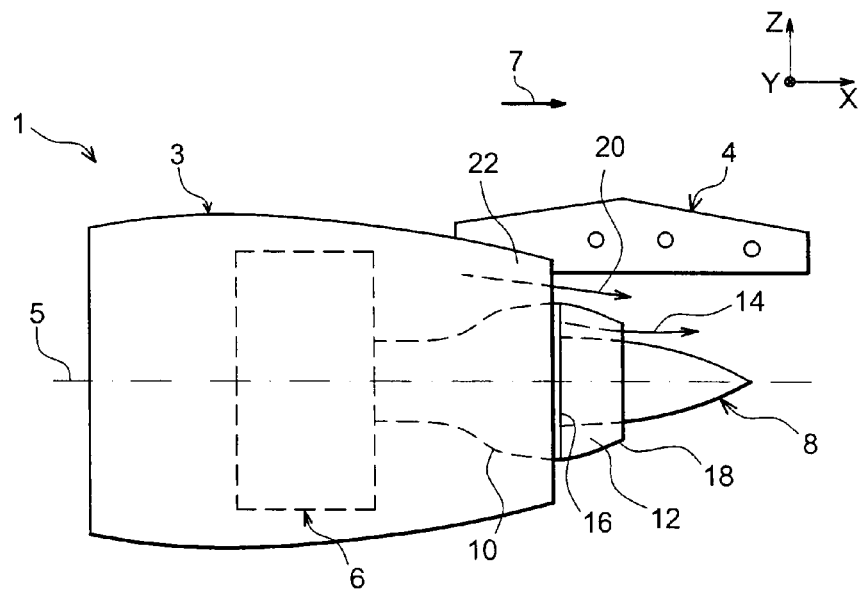
FIG. 1 illustrates a side view of an engine assembly for an aircraft, according to one preferred embodiment of the present invention.
Figure 2:
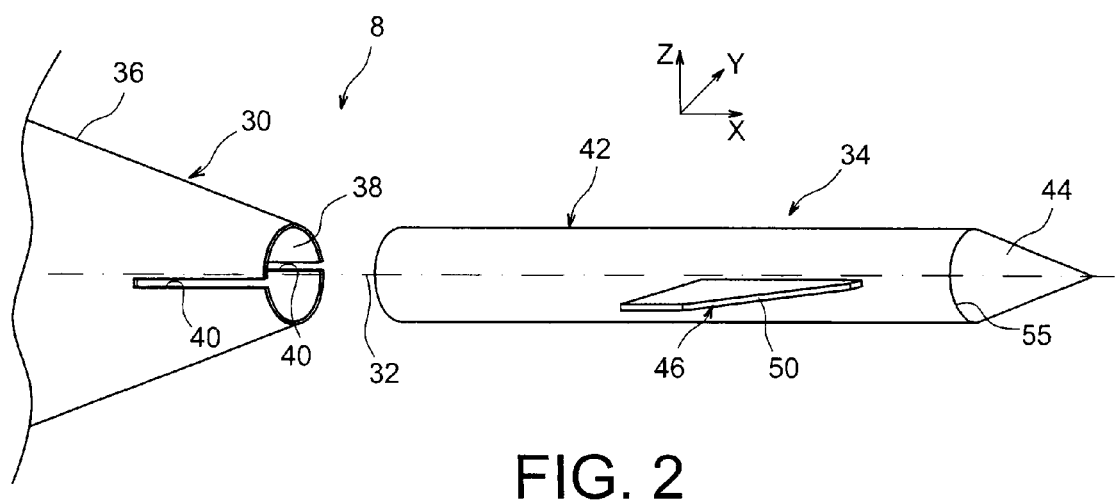
FIG. 2 illustrates an exploded perspective view of a rear portion of the gas ejection cone belonging to the engine assembly shown in FIG. 1, and which is also an object of the present invention.

In reference first to FIG. 1, we see an engine assembly 1 for an aircraft designed to be fixed under a wing of this aircraft (not shown), this assembly 1 globally comprising an attachment device 4, a turbojet 6 such as a dual-flow turbojet with a high rate of dilution attached under this device 4, and a nacelle 3 surrounding the turbojet 6. Moreover, it comprises a gas ejection cone 8 (from the English "plug") extending a crankcase 10, this cone 8 defining a radially inner skin of an annular primary flow 14 channel 12, centered on the longitudinal axis 5 of the turbojet 6.

In the entire description which follows, by convention, X designates the longitudinal direction of the device 4 which can also be likened to the longitudinal direction of the turbojet 6 and of its ejection cone 8, this direction X being parallel to the longitudinal axis 5 of this turbojet 6. Furthermore, Y designates the direction oriented transversely in relation to the device 4 and which can also be likened to the transverse direction of the turbojet 6 and of its ejection cone 8, and Z to the vertical direction or the height, these three directions X, Y and Z being orthogonal relative to each other.

Moreover, the terms "forward"/"upstream" and "rear"/"downstream" should be considered in relation to a direction of the thrust exerted by the turbojet 6, this direction being illustrated diagrammatically by the arrow 7.

Still in reference to FIG. 1, in which one can see, diagrammatically, by line 16 that the ejection cone 8 is fixedly mounted on a rear end of the crankcase 10, via traditional fixing means, it is noted that the assembly 1 also comprises an annular structure 18 surrounding the cone 8 and also mounted on the rear end of the crankcase 10.

As known by those skilled in the art, this annular structure 18, also called a nozzle, defines a radially outer skin of the annular primary flow 14 channel 12, and is also outwardly bathed by the secondary flow 20 escaping from the secondary annular channel 22. Thus, the primary flow 14 passes between the cone 8 and the structure/nozzle 18 before continuing to fit this same cone 8, to then be ejected from the engine assembly 1.

Lastly, it is specified that the attachment device illustrated in FIG. 1 corresponds solely to the primary structure thereof, the other component elements of this device 4 and known by those skilled in the art such as the engine fasteners, the secondary structures of the aerodynamic fairing type, etc., not having been shown.

In reference now to FIGS. 2 to 6, one can see the gas ejection cone 8 in more detail, also an object of the invention, which is globally made up of a hollow and annular main body 30, of truncated shape having a longitudinal axis 32 combined with the axis 5 of the turbojet, and a device 34 for generating turbulence in the primary flow.

The hollow main body 30 is the element which defines, with its truncated outer surface, the radially inner skin 36 of the annular primary flow 14 channel 12. Due to its truncated shape, it ends with an open trailing edge or downstream end, assuming the form of a circular opening 38 centered on the axis 32.

Stemming from this outlet opening 38 are two slots 40 formed essentially longitudinally on the hollow body, i.e. parallel to the direction X, toward the front. They are preferably realized symmetrically relative to a vertical plane of symmetry of the turbojet (not shown), as visible in FIG. 2.

Still in this same figure illustrating an exploded view, one can see that the device for generating turbulence 34 comprises a cylindrical support body 42 arranged along the axis 32, this body for example having a circular section of diameter essentially identical to that of the outlet opening 38 of the body 30. Moreover, the support body 42 has a downstream end 44 of conical shape, still with axis 32, the solid angle of which defined by the cone is identical to the solid angle of the truncated outer surface 36 of the body 30.

On the cylindrical portion, the body 30 supports two fins 46 (only one of which is visible in FIG. 2 due to the angle of the perspective), each of the fins being essentially horizontally oriented, i.e. in a plane XY, and being arranged symmetrically on either side of the body 30, in relation to the aforementioned vertical plane of symmetry.

Each fin 46, preferably lifting, preferably assumes the general form of a "delta wing", with its base oriented toward the front.

One of the particularities of the invention lies in the fact that the device 34 is mounted so as to move on the hollow main body 30 so as to be displaced from an extracted position in which it projects toward the downstream relative to the downstream end of the body 30, and a retracted position in which it is retracted in this same body, and vice versa.

Figure 3:
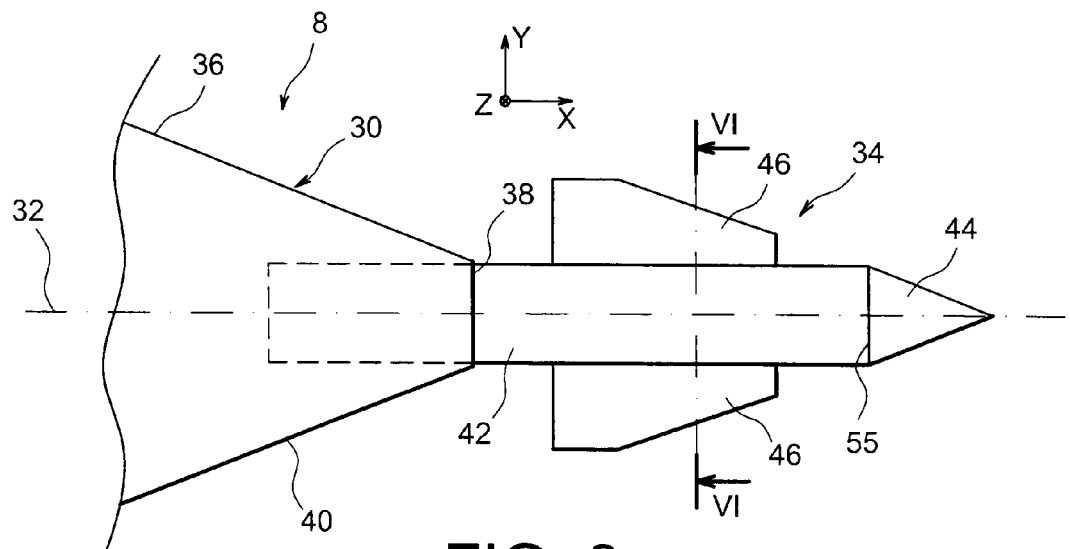
FIG. 3 illustrates a top view of the rear portion of the gas ejection cone shown in FIG. 2, with its device for generating turbulence in the primary flow in the extracted position.

More precisely in reference to FIG. 3, one can see the device 34 in its extracted position in which it is capable, owing in particular to the fins 46 playing a deflector role, of generating turbulence on the primary flow downstream from the outlet opening 38, leading to reduced jet noise. In this position, the cylindrical support body 42, mounted automatically so as to slide along the direction X through the opening 38, is partially extracted toward the downstream, which makes it possible in particular to offset the fins in this same direction relative to the opening 38. Thus, the primary flow escaping from the trailing edge of the hollow main body 30 spreads toward the rear before coming into contact with the fins 46 generating the expected turbulence/vortices, not or only slightly affecting the secondary annular flow arranged radially toward the outside.

These vortices thus created then spread into the primary flow, toward the downstream. Due to their dynamics, the vortices will thus modify the mixing more downstream, preferably up to the vicinity of the end of the potential cone of the primary jet, and thus improve the acoustic impact of the mixing of the primary and secondary flows.

Still in the same position adopted when it is necessary to reduce the jet noise of the turbojet, i.e. in particular during the takeoff and landing phases of the aircraft, synonymous with noise nuisances for airport inhabitants, the conical downstream end 44 is therefore situated greatly at a distance toward the rear relative to the trailing edge of the main body 30 defining the outlet opening 38.

Figure 4:
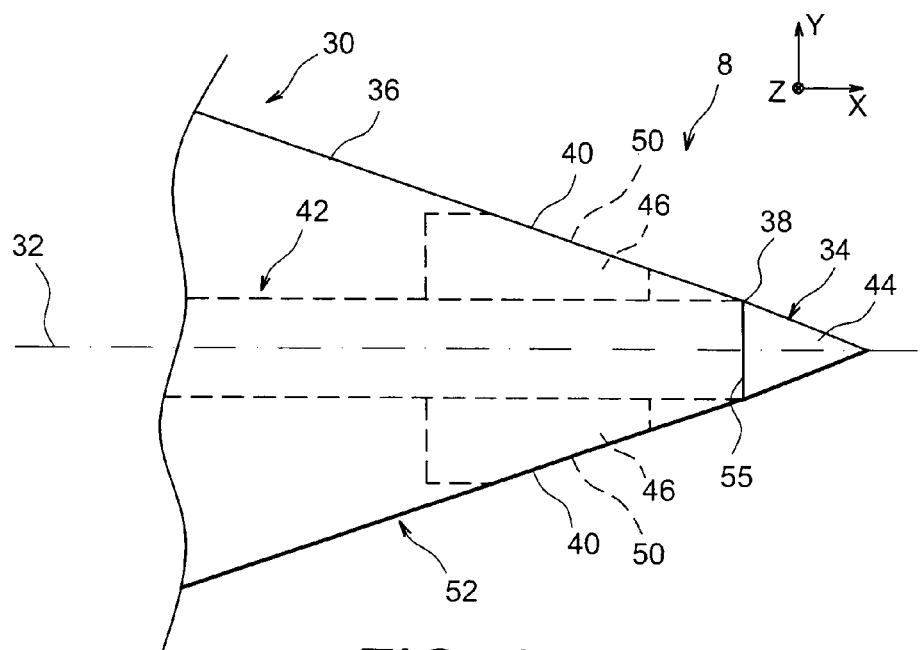
FIG. 4 illustrates a top view of the rear portion of the gas ejection cone shown in FIGS. 2 and 3, with its device for generating turbulence in the primary flow in the retracted position.
Figure 5:
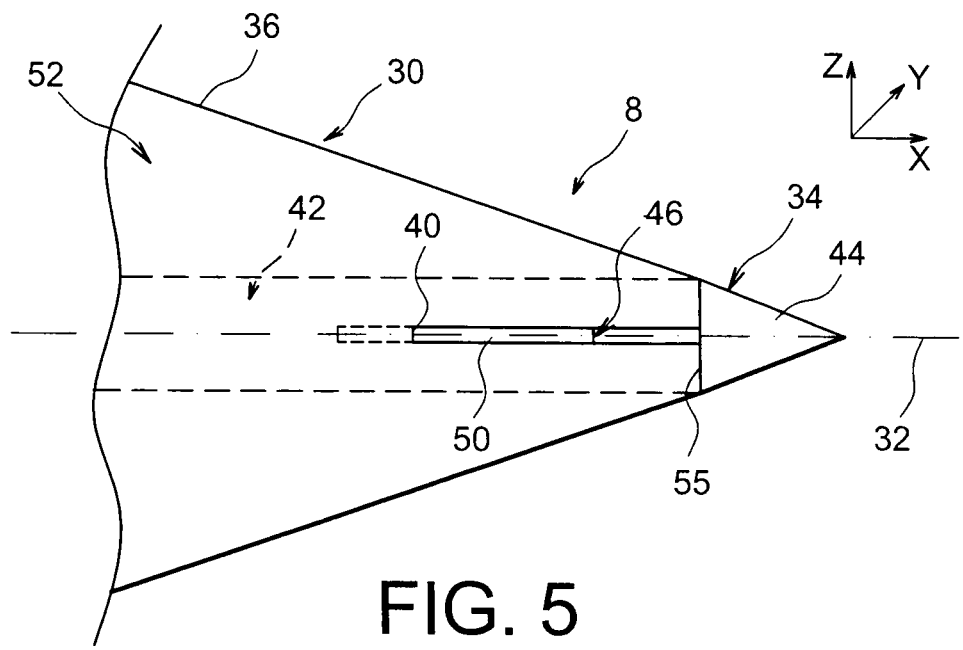
FIG. 5 shows a perspective view of the view shown in FIG. 4.

When the aircraft is in the cruising phase, and it is then no longer necessary to reduce the jet noise, and moreover not desirable to pointlessly reduce the thrust by generating aerodynamic disturbances of the primary flow with the device 34, the latter is controlled traditionally in translation along the axis 32, toward the front in order to reach its retracted position shown in FIGS. 4 and 5.

During the forward movement of the device 34, the fins 46 gradually penetrate the slots 40 situated opposite them, respectively, thereby ensuring that there is no mechanical interference of a nature to result from the laterally projecting position of the fins 46 in relation to the support body 42.

The movement is stopped when the device 34 is sufficiently retracted into the hollow body 30 to create the least possible aerodynamic disturbance on the primary flow fitting the assembly of the cone 8, this in particular being obtained by ensuring on one hand that the fins 46 no longer project toward the outside of the hollow main body through the slots 40, and on the other hand that only the conical downstream end 44 projects toward the rear of the main body 30.

More precisely, one ensures that the device for generating turbulence 34, occupying its retracted position, jointly with the hollow main body 30 forms an essentially continuous conical outer surface 52. To do this, the essentially continuous conical outer surface 52 is realized in part by the truncated outer surface 36 forming radially inner skin of the annular primary flow channel, completed by the lateral edges 50 of the two fins situated in the aerodynamic extension of this surface 36, these two lateral edges 50 housed in the two slots 40, respectively, therefore being flush with the skin 36. Thus, it is to be understood that the fins 46 fill in the slots 40 without projecting outwardly therefrom, which procures the desired aerodynamic extension.

Furthermore, the conical outer surface 52 is also completed toward the rear by the conical outer surface of the downstream end 44 of the device 34, since this surface, by being flush with the truncated surface 36, constitutes the aerodynamic extension thereof. To do this, one provides as stated above that the base 55 of the downstream end 44 of the device 34, which is an integral part of the body 42, has a diameter essentially identical to that of the outlet opening 38, with which it is essentially combined when the device is in its retracted position.

Figures 6, 6A:
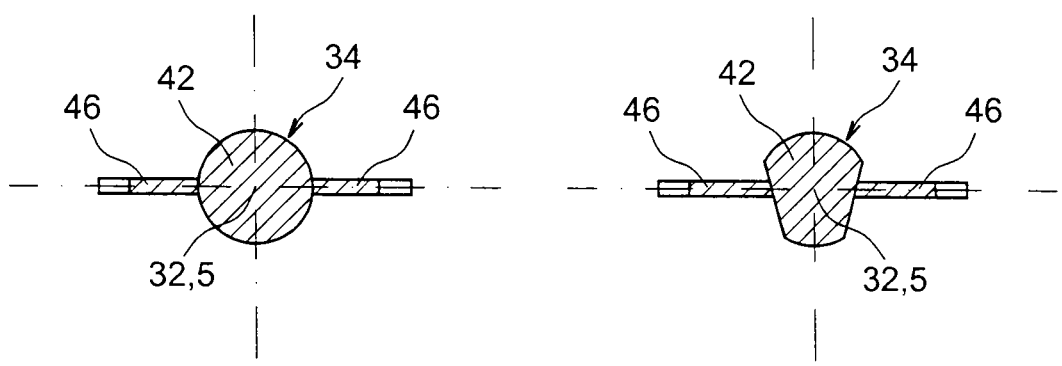
FIG. 6 illustrates a cross-sectional view along line VI-VI of FIG. 3.
FIG. 6a is a view similar to that of FIG. 6, in which the device for generating turbulence in the primary flow is realized according to an alternative.

In FIG. 6, one can see that the two fins 46 are effectively arranged symmetrically relative to a vertical plane passing through the axis 35 combined with the axis 5, the fins being essentially arranged in a same horizontal plane passing through this same axis 32.

FIG. 6a shows an alternative embodiment of the device 34. The dissymmetry of the shape of the cylindrical support body 42, relative to a horizontal plane, ensures lifting for the horizontal fins 46.

Of course, one skilled in the art can make various modifications to the invention just described, solely as a non-limiting example. In this respect, one can in particular indicate whether the engine assembly 1 was presented in a suitable configuration for it to be suspended under the wing system of the aircraft; this assembly 1 could also assume a different configuration enabling it to be mounted above this same wing assembly, or even on a rear portion of the fuselage of this aircraft.

The invention claimed is:

1. A gas ejection cone for an aircraft turbojet, comprising:
a hollow main body defining, on the outside, a radially inner skin of an annular primary flow channel of the turbojet; and
a device generating turbulence of the primary flow, mounted so as to move on the main body so as to be able to be displaced from an extracted position in which the device projects toward downstream in relation to a downstream end of the hollow main body, and a retracted position in which the device is retracted into the hollow main body, and vice versa, the device generating turbulence comprising a cylindrical support body having an axis parallel to an axis of the ejection cone, and at least one fin supported by the cylindrical support body,
wherein the hollow main body comprises a slot for the housing of each fin of the device for generating turbulence in its retracted position.

2. The gas ejection cone according to claim 1, wherein the device comprises two fins oriented essentially horizontally, and arranged on either side of the cylindrical support body.

3. The gas ejection cone according to claim 1, wherein the device generating turbulence, in its retracted position, and jointly with the hollow main body, forms an essentially continuous conical outer surface.

4. The gas ejection cone according to claim 1, wherein the device generating turbulence includes a conical downstream end, situated in an aerodynamic extension of the hollow main body, when the device generating turbulence is in its retracted position.

5. A turbojet for an aircraft comprising a gas ejection cone according to claim 1.

6. An engine assembly for an aircraft comprising:
a turbojet according to claim 3,
an attachment mast of the turbojet; and
a nacelle integral with the mast and surrounding the turbojet.

* * * * *